(12) United States Patent
Davie

(10) Patent No.: US 6,526,200 B1
(45) Date of Patent: Feb. 25, 2003

(54) OPTICAL CABLE BASED DIRECTIONAL WAY FINDING APPARATUS AND METHOD

(75) Inventor: Allan John Davie, East Lothian (GB)

(73) Assignee: Ferranti Photonics Limited (GB)

( * ) Notice: Subject to any disclaimer, the term of this patent is extended or adjusted under 35 U.S.C. 154(b) by 0 days.

(21) Appl. No.: 09/806,040

(22) PCT Filed: Sep. 24, 1999

(86) PCT No.: PCT/GB99/03002

§ 371 (c)(1),
(2), (4) Date: Jun. 12, 2001

(87) PCT Pub. No.: WO00/17572

PCT Pub. Date: Mar. 30, 2000

(30) Foreign Application Priority Data

Sep. 24, 1998 (GB) ............................................. 9820854

(51) Int. Cl.⁷ ................................................. G02B 6/26
(52) U.S. Cl. .......................... 385/31; 385/901; 362/559
(58) Field of Search ............................. 385/31, 48, 49, 385/88, 89, 123, 147, 901; 362/551, 555, 559

(56) References Cited

U.S. PATENT DOCUMENTS 6,259,838 B1 * 7/2001 Singh et al. .................. 385/31
6,347,172 B1 * 2/2002 Keller et al. ................ 385/102

* cited by examiner

*Primary Examiner*—Hemang Sanghavi
(74) *Attorney, Agent, or Firm*—Gifford, Krass, Groh, Sprinkle, Anderson & Citkowski, P.C.

(57) ABSTRACT

A directional way finding system is described which comprises a light emitting device having a plurality of side emitting light conduits arranged side by side with parts of the conduits covered at repeated intervals along the length of the conduits to leave an exposed sequence of light emitting sections in each conduit. These sections are longitudinally offset in adjacent conduits to provide diagonal light emitting regions, so that when the conduits are sequentially energised light is emitted from the light emitting sections to give to an observer the perception of light travelling in a forward or reverse direction, depending on the order in which the conduits are scanned. Embodiments are described for a system in which the light conduits are optical fibres energised from a laser and in which the light conduits are electroluminescent wires energised from a switched power supply.

31 Claims, 3 Drawing Sheets

OPTICAL CABLE BASED DIRECTIONAL WAY FINDING APPARATUS AND METHOD

FIELD OF THE INVENTION

The present invention relates to optical cables and particularly, though not exclusively, to their use in way finding systems in emergency situations.

Currently available emergency way finding apparatus use lighting systems which operate by providing distributed continuous light sources. The sources are generally positioned at strategic locations such as doors, tops and bottoms of stairwells, exits etc. If a person is in unfamiliar surroundings or is disorientated, such as may happen in a smoke-filled environment, current lighting systems provide no guidance on the preferred or shortest route to safety.

Some aircraft have been fitted with strips of individual lights at floor level, these strips being set in the floor. These strips are illuminated sequentially in the event of an emergency. They are unidirectional and may, in certain circumstances, direct passengers towards rather than away from the hazard.

Side emitting optical fibres can provide light emission over a relatively long length of fibre and, in the corresponding published application WO 98/45645, a portable illumination system is described which provides light emission from a side-emitting fibre optic several kilometers in length using a laser source. Such a system has applications in emergency lighting for stairwells, cinemas, aircraft and the like. Though relatively inexpensive and portable, this illumination system is limited to illumination of a single edge emitting optical fibre which has no way finding capabilities.

Recently, electroluminescent wires have become available which provide a continuous linear light source in a flexible cable. Electroluminescent wires are available as LYTEC (Trade Mark) Electroluminescent Wires distributed by Magtech Limited, U.K. These wires require very low power to operate and hence are generally used for display purposes, e.g. Christmas tree lighting.

SUMMARY OF THE INVENTION

It is an object of at least one embodiment of the present invention to provide a directional way finding system which obviates or mitigates at least one of the aforementioned disadvantages.

This is achieved by providing a plurality of side emitting light conduits arranged side by side, and covering parts of the conduits, at repeated intervals along the length of the conduits to leave an exposed sequence of light emitting sections in each conduit, these sections being longitudinally offset in adjacent conduits, so that when the conduits are sequentially energised light is emitted from the light emitting sections to give the perception of light travelling in a forward or reverse direction (depending on how the conduits are scanned) to an observer.

According to a first aspect of the present invention there is provided a light emitting device for use in a directional way finding system said light emitting device comprising:

a plurality of side emitting light conduits arranged side by side in a longitudinal direction, each conduit having alternating optically opaque sections and light emitting sections along its length, the conduits being arranged with the light emitting sections of one conduit being offset in one direction from an adjacent conduit such that corresponding light emitting sections of the conduits form diagonal light emitting structures across the plurality of conduits at intervals along the length of the conduits.

In a preferred embodiment, the light conduits are side emitting optical fibres.

Advantageously, the light emitting device includes optical fibre positioning means, said optical fibre positioning means comprising a structure with a plurality of locating means for receiving and locating the plurality of optical fibres side by side to position optical fibre ends for illumination by a directed light beam.

The locating means may be provided by a plurality of optical fibre guide apertures disposed in said structure. Preferably the structure has first and second surfaces parallel to each other. Conveniently the plurality of optical fibre guide apertures are located between the first surface and the second surface, and are disposed in a common plane in said structure.

The optical fibre ends are located within each fibre guide aperture to align the optical fibre ends with the first surface.

Preferably the or each locating means includes securing means to secure the optical fibre in the respective optical fibre guide apertures. The securing means may be provided by a threaded aperture in which a screw is located for securing the optical fibre in the optical fibre guide aperture. Alternatively the securing means may be an adhesive material.

Conveniently, an optical component, such as a lens may be mounted within each optical fibre guide aperture near to the first surface to focus the light into the optical fibre end.

Preferably the first and second surfaces are curved. Advantageously the fibre guiding apertures are located equidistantly apart and on the same plane in said structure.

In an alternative embodiment the light conduits are side emitting electroluminescent wires.

Preferably the optically opaque sections are formed by masking a side emitting light conduit with a length of opaque material.

Advantageously the length of optically opaque material is a black plastic being heatshrunk onto the light conduit.

Alternatively the optically opaque sections are formed by positioning the light conduits in one or more partially covered receptacles. The partially covered receptacles having covered portions which are optically opaque. Advantageously the partially covered receptacles have a width approximately equal to a width of the plurality of light conduits.

Advantageously there is an equal number of optically opaque sections and light emitting sections on each light conduit.

Advantageously the optically opaque sections are longer in length than the light emitting sections.

Advantageously the optically opaque sections are twice as long as the light emitting sections.

In the preferred embodiment the optically opaque sections are one meter in length.

Advantageously the light conduits are identical.

In the preferred embodiment the side emitting optical fibres are 5 mm in diameter. In the alternative embodiment the electroluminescent wires are 2.5 mm in diameter.

Advantageously the offset is a distance substantially equal to the length of a light emitting section.

Preferably the diagonal light emitting structures across the conduits are repeated when the end of a final light emitting section of a final light conduit is substantially aligned with a start of a light emitting section of a first light conduit.

Advantageously the plurality of light conduits is up to 150 meters in length.

According to a second aspect of the present invention there is provided a directional way finding system comprising:

drive means,
a light emitting device as defined in the first aspect of the invention, and means for selectively energising one or more light conduits in a pattern to provide the perception of sequential illumination to a viewer.

Preferably the light conduits are selectively energised in a scanned pattern from a first light conduit to a final light conduit of the light emitting device to illuminate light emitting optical sections of side emitting light conduits to provide the perception of sequential illumination to a viewer.

In a preferred embodiment the drive means is a laser light source.

The laser light source may be of any type of laser but preferably is a solid state laser which is, in turn, excited by a semi-conductor diode laser.

Preferably the plurality of light conduits comprises optical fibres arranged side by side in the same plane.

More preferably there are three optical fibres.

Preferably the means for selectively energising one or more light conduits includes means for steering, in use, laser light from the laser light source to the light emitting device such that the laser light is scanned from a first optical fibre to a final optical fibre of the light emitting device to illuminate light emitting optical sections of side emitting optical fibres to provide the perception of sequential illumination to a viewer. The means for steering the laser light may be a rotatable mirror. Any suitable component which has light steering properties may be used. Preferably the mirror is mounted on a spindle which, when rotated on a vertical axis, turns the mirror and causes the laser light incident on the mirror to be reflected along the plane of the optical fibres. Alternatively the laser light is incident on the mirror to be reflected along a path which traverses a plane on a first surface of an optical fibre positioning means in which said optical fibres are disposed. The light traversing the first surface illuminates optical fibre ends located along the path.

In use the steerable optic element is rotated to scan the fibre optic ends sequentially in order from the first optical fibre to the final optical fibre or, alternatively, from the final optical fibre to the first optical fibre.

Advantageously two or more light emitting devices may be concatenated to provide a directional way finding system of an extended length. The laser light source of first light emitting device may be used as the input to one or more subsequent light emitting devices by coupling part of the laser light source output into a low-loss optical fibre, the output of this low-loss optical fibre being used as the input to a subsequent light emitting device and/or being coupled to a subsequent low-loss optical fibre. The low-loss optical fibre(s) may be positioned in parallel with the side emitting optical fibres. Coupling into and out of the low-loss optical fibre may be provided by any optical element such as a beamsplitter or lens.

In an alternative embodiment the drive means is a power supply to energise electroluminescent wires. Preferably the drive means provides a voltage of 140V a.c. 400 Hz. More preferably the drive means is derived from a 12 volt d.c. source.

Preferably the plurality of light conduits comprises electroluminescent wires arranged side by side in the same plane. More preferably there are three electroluminescent wires. Advantageously the means for selectively energising one or more light conduits includes switching means to allow selective energisation of one or more electroluminescent wires. Preferably the switching means includes a FET (Field Effect Transistor) More preferably the switching means is controlled by a microprocessor. The microprocessor may be programmed with a desired switching sequence. Advantageously the switching means and the microprocessor are isolated from each other by an opto-switch.

According to a third aspect of the present invention there is provided a method of providing an illuminated signal to provide to a viewer the perception of movement of the signal in a direction along a plurality of light conduits, said method comprising the steps of, providing a plurality of side emitting light conduits and arranging the light conduits side by side,
masking each light conduit at repeated intervals along its length to prevent the emission of light in the masked area,
aligning corresponding masked regions in adjacent conduits to define exposed light emitting areas which have a substantially diagonal structure, and
energising the plurality of side emitting light conduits sequentially to create an emitted light signal which appears to the viewer to be travelling along the plurality of conduits in one direction.

The direction of perception in which light is travelling is selected by reversing the sequence of energising said plurality of light conduits.

In an embodiment of the present invention the method may include the step of providing sequentially scanned laser light over an extended directional way finding system by coupling a first low-loss optical fibre to the laser light source, sequentially scanning optical fibre ends of a light emitting device and energising said low-loss optical fibre to at least one subsequent light emitting device.

BRIEF DESCRIPTION OF THE DRAWINGS

These and other aspects of the present invention will become apparent from the following description when taken in combination with the accompanying drawings in which.

DETAILED DESCRIPTION OF THE INVENTION

Figure 1:
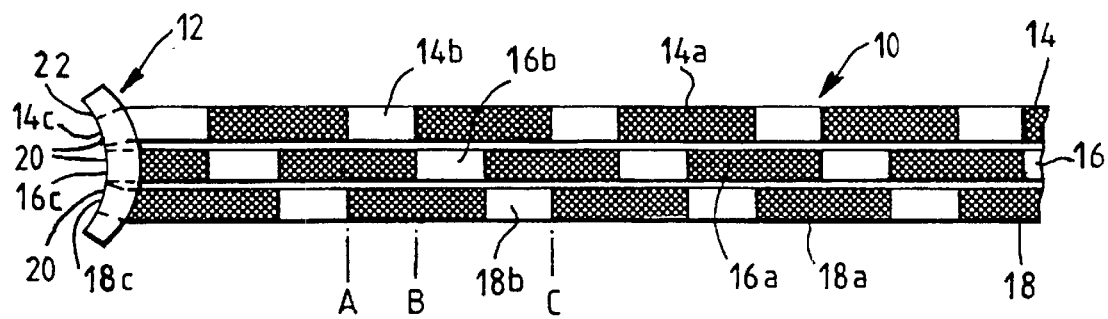
FIG. 1 is a top view of a light emitting device including an optical fibre positioning head in accordance with a first embodiment of the present invention.

Reference is now made to FIG. 1 of the drawings which depicts a light emitting device provided by a composite cable, generally designated 10, including an optical fibre positioning head 12 in accordance with a first embodiment of the present invention. The composite cable consists of three side emitting optical fibres 14,16,18 arranged side by side in a flat ribbon arrangement. Each optical fibre 14,16,18 is 5 mm in diameter and each is covered with a series of optically opaque sections 14a,16a,18a respectively separated by a distance of half a meter, to provide an equal number of light emitting sections 14b,16b,18b respectively. The optically opaque sections 14a,16a,18a are provided by using black plastic heatshrunk onto the fibres.

The corresponding light emitting sections 14b,16b,18b are offset from each other by a distance of half a meter. In this way the end of a light emitting section 14b of one fibre 14 aligns with the start of a light emitting section 16b on a neighbouring fibre 16 and the end of 16b aligns with the start of light emitting section 18b as illustrated at point B in FIG. 1.

Consecutive light emitting sections 14b,16b,18c across the fibres 14,16,18 are repeated as diagonal light emitting structures between A and B, for example, as shown in FIG. 1.

The optical fibre positioning head 12 is connected to fibres 14,16,18 at one end. A similar optical fibre positioning head 12 is disclosed in applicant's co-pending U.K. Patent Application No. 9820246.8 incorporated herein by reference. Fibres 14,16,18 are located in fibre optical guide apertures 20 in the optical fibre positioning head 12 such that optical fibre ends 14c,16c,18care secured to the head by adhesive and are aligned with a first surface 22 of the optical fibre positioning head 12.

Figure 2:
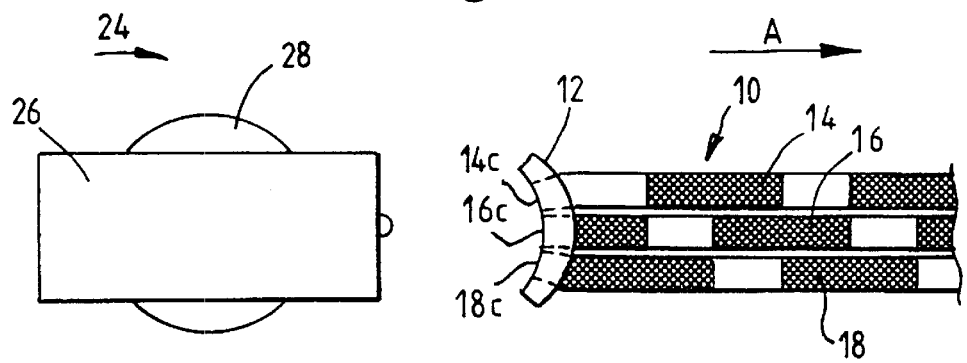
FIG. 2 is a diagrammatic top view of a directional way finding system in accordance with the first embodiment of the present invention.

Reference is now made to FIG. 2 which depicts a directional way finding system, generally designated 24, in accordance with a first embodiment of the present invention. The fibre optic cable 10 and positioning head 12 are aligned with laser 26. The laser 26 consists of a semi-conductor diode laser pumped solid state laser (dpssl) which is a neodymium yttrium orthovanadate (Nd:YVO$_4$) laser with intra-cavity frequency doubling to produce light at a wavelength of 532 nanometers (nm). The laser 26 produces a laser beam 1 mm in diameter which exits the laser at a light power of up to 1 Watt (W). The laser 26 is connected to a suitable power supply (not shown).

Laser 26 is positioned on a rotating mount 28 such that when rotated the laser light beam illuminates the optical fibre ends 14c,16c,18c. In use, the laser 26 is rotated to scan sequentially across the optical fibre ends, return rapidly to its starting point and scan sequentially again. This cycle is repeated continuously to operate the directional way finding system. A laser beam is incident on the fibre ends in the following continuous sequence 14c,16c,18c,14c,16c,18c . . . etc. As the light travels along the fibres an observer looking at the cable sees light being emitted from repeated sections 14c,16c,18c but perceives the light to be travelling in the direction of arrow A (to the right) as shown, and are, consequently directed in this direction.

Alternatively, if the laser 26 is rotated to scan sequentially the optical fibre ends in the reverse order, i.e. 16c,14c,18c to establish a pattern 16c,14c,12c,16c,14c,12c . . . etc., an observer perceives the light to be travelling in the reverse direction and is so directed that way.

Figure 3:
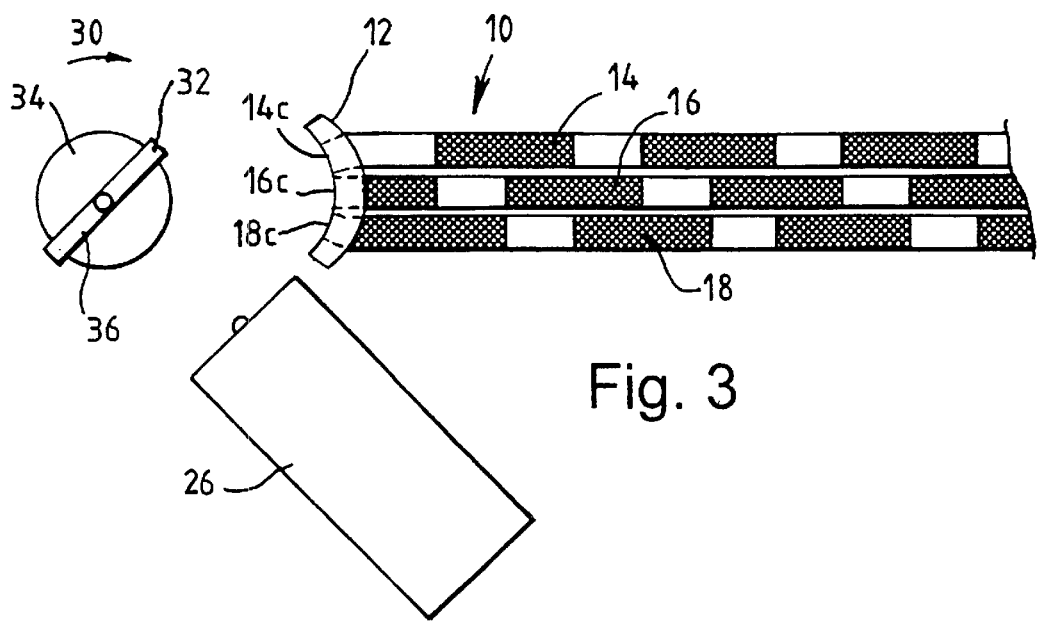
FIG. 3 depicts a diagrammatic top view of a second embodiment of a directional way finding system.

Reference is now made to FIG. 3 which depicts a directional way finding system, generally designated 30 in accordance with a second embodiment of the present invention. The fibre optic cable 10 and positioning head 12 are as described hereinbefore. The laser 26 is now located to one side of the fibre optic cable 10. The laser light beam is directed towards a mirror 32 mounted on a rotatable mount 34. The rotatable mount may be driven by external means (not shown). With a continuous laser light source, the mirror 32 is rotated on a vertical axis such that laser light incident on the mirrored surface 35 is reflected along a path which traverses the fibre optic ends 14c,16c,18c. The mirror can be rotated clockwise or counter-clockwise and the reflected light incident on the optical fibre ends 14c,16c,18c can sequentially scan the optical fibre ends 14c,16c,18c in either direction, to provide a directional way finding system 30.

Figure 4:
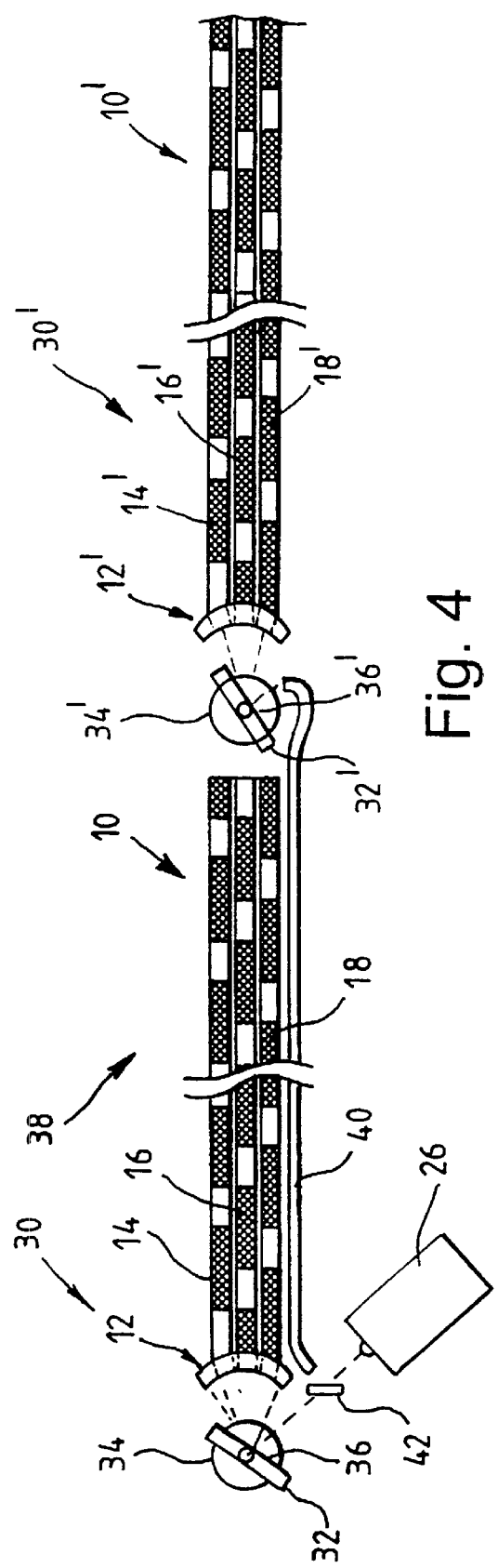
FIG. 4 depicts a diagrammatic top view of an extended directional way finding system.

Reference is now made to FIG. 4 which depicts a directional way finding system, generally designated 38, of extended length. Each fibre optic cable 10,10$^1$ and positioning head 12,12$^1$ are identical but for clarity the second positioning head 12$^1$ and fibre optic cable 10$^1$ and similar apparatus have been suffixed "—".

Two identical fibre optic displays 10,10$^1$ and positioning head 12,12$^1$ are concatenated. In front of each fibre optic cable 10,10$^1$ display is positioned a rotatable mirror 32,32$^1$. In addition, the first fibre optic cable 5 has a beamsplitter 426 and a low-loss optical fibre 40. The low-loss optical fibre 40 is positioned so that its input is matched to an output of the beamsplitter 42, the low-loss optical fibre 40 lies in parallel with the side emitting optical fibres 14,16,18 of the First fibre optic cable 10, and the output of the low-loss optical fibre 40 is positioned to reflect from mirrored surface 36$^1$, and provide the input to the second fibre optic display 30$^1$. This arrangement allows both a single laser 26 to be used and provides a potentially limitless length for a directional way finding system. Each fibre optic display 30,30$^1$ is limited to approximately 150 m in length due to attenuation losses as the laser light travels through the fibres.

Although only two fibre optic displays 30,30$^1$ are shown in the directional way finding system 38, it is understood that any number of fibre optic displays may be added by coupling low-loss optical fibres together in parallel with the fibre optic displays. It is also understood that a variety of optical coupling means may be used to couple a portion of the laser light into the low-loss optical fibre 40, and couple the output of the low-loss optical fibre 40 towards the mirrored surface 36$^1$ and/or into any subsequent low-loss optical fibres.

Figure 5:
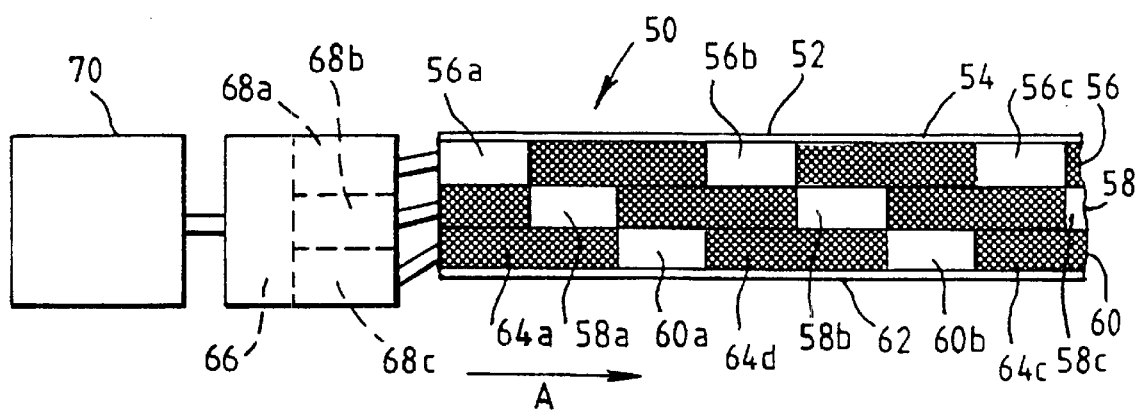
FIG. 5 is a diagrammatic top view of a directional way finding system in accordance with a third embodiment of the present invention.

Reference is now made to FIG. 5 which depicts a directional way finding system, generally designated 50, in accordance with a third embodiment of the present invention. A light emitting device, generally designated 52, includes a rope 54 of three 2.5 mm thick LYTEC (Magtech U.K.) electroluminescent wires 56,58,60 laid side by side. The colour of the wires can be selected. The wires 56,58,60 each consist of a central conductive core coated with an electroluminescent material. A bare electrical wire is wound around the core down the length of the electrical wire and the arrangement by surrounded in a flexible opaque cladding. When energised, the central conductive core and the electrical wire act as a capacitor. The resulting charge between the two causes the electroluminescent material to luminesce.

The rope 54 is placed within a partially covered receptacle 62 which holds the wires 56,58,60 in a flat ribbon arrangement. Optically opaque diagonal sections 64a,b,c are positioned equally along the receptacle 62 and cover portions of the wires 56,58,60 leaving light emitting sections 56a,b, c;58a,b,c;60a,b exposed.

Figure 6:
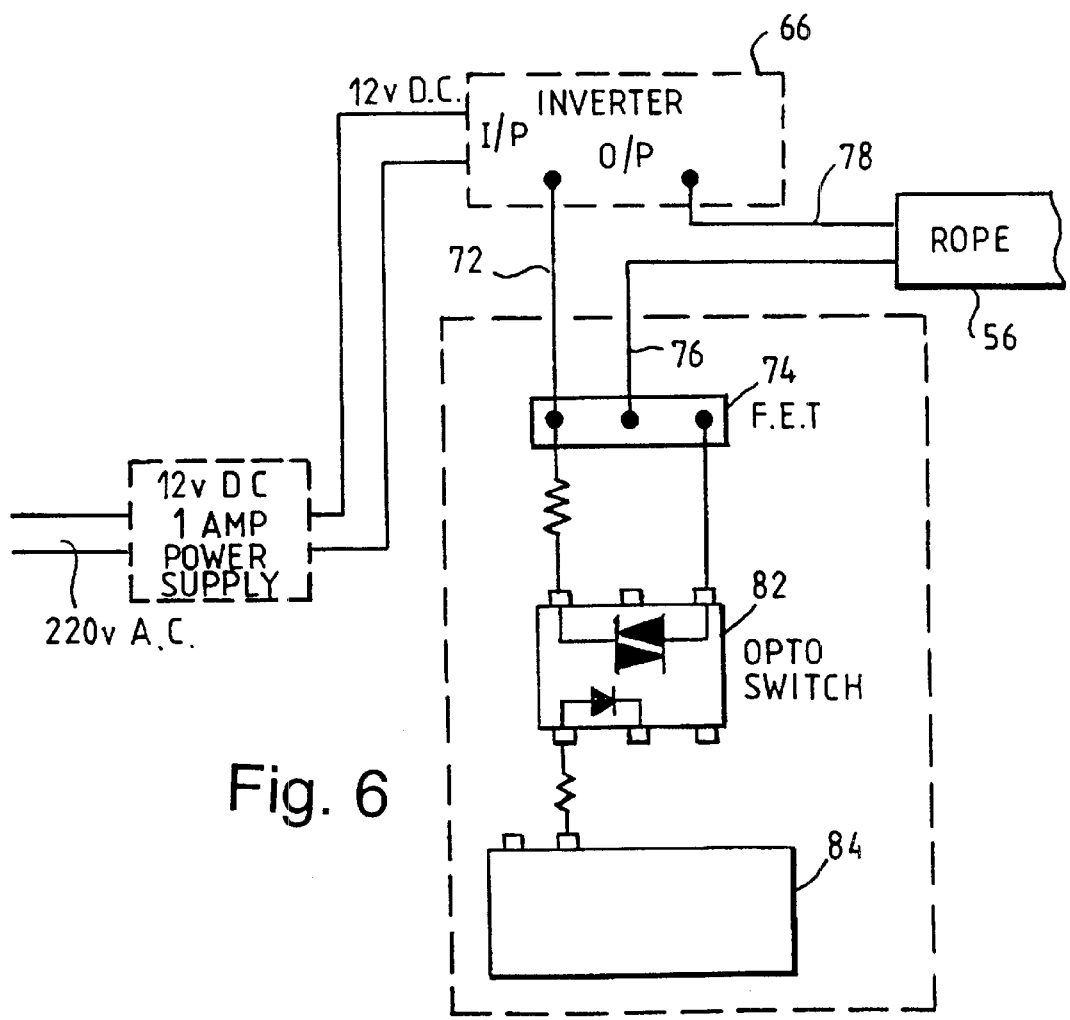
FIG. 6 is a schematic diagram of a switching circuit and drive means in accordance with the third embodiment.

Each wire 56,58,60 is connected to a respective switching circuit 68a,b,c which are connected to a power supply 70. The power supply 70, which may be mains powered, supplies a 12 volt voltage to an inverter 66 (Model No. P6, Farnell, U.K.) which produces 140 V. a.c. 400 Hz signal to the wires. The voltage and frequency may be varied to suit the type of electroluminescent wires used but this supply is the most suitable for the LYTEC electroluminescent wires used. The rope switching circuit 68 is illustrated in FIG. 6. Inverter output 72 is fed to a FET 74 (Model No. BT137B-500 available from R.S. Components Ltd., U.K.) One FET output 76 and one inverter output 78 are connected to the electroluminescent wire 56 to power the wire. A further FET port 80 together with inverter output 72 are switched at an opto switch 82, (Triac Model No. MOC 3021 from IsoCom Components) which allows the wire 56 to be held in an ON or OFF state. The opto switch 82 function is controlled by software stored in an 8 bit microprocessor (Model No. Z86E0208, a CMOS microcontroller available from R.S. Components Ltd., U.K.) having 512 bytes of EPROM and 60 bytes of RAM.

The microprocessor 84 can be used to control switching of any number of opto switches 82 which are, in turn, connected between an inverter 66 and a similar number of wires 56,58,60. In the example given in FIG. 6, three opto switches are connected to the three wires 56,58,60, the switches being in switching circuits 68a,b,c. to provide a compact system driven from a single power supply.

In operation, the directional way finding system 50 is programmed via the microprocessor 84 to switch power to the wires 56,58,60 in the following continuous cyclic sequence 56,58,60,56,58,60 . . . . As each wire is energised in turn an observer sees light being emitted from sections 56i a,58a,60a;56b,58b,60b etc. and perceives the light to be travelling in the direction of arrow A (to the right) as shown, and are, consequently, directed in this direction.

Alternatively, if the microprocessor 84 is programmed to reverse the order of switching, an operating pattern 60,58, 56,60,58,56 . . . is established and the observer perceives the light to be travelling in the reverse direction.

The principal advantage of the present invention is that it provides a light guiding system which is directional, thus indicating to an observer a direction to be followed. A further advantage of the present invention is that the direction to be followed is readily reversible. This is particularly useful when a normal exit route is obstructed or the emergency, e.g. fire, is on the normal exit route. Still a further advantage of the present invention is that the light conduits are flexible so that any pathway, even a convoluted one, can be laid out and a pathway can be easily relocated.

It will be appreciated that various modifications may be made to the embodiments hereinbefore described without departing from the scope of the invention.

The system can be used as bidirectional, or unidirectional, if required. There may be 4, 5 or more conduits arranged in a flat ribbon to create a wider cable. Sections of the light conduits may be masked or covered where directional signalling is not required.

What is claimed is:

1. A light emitting device for use in a directional way finding system, said light emitting device comprising:
   a plurality of side emitting light conduits arranged side by side in a longitudinal direction, each conduit having alternating optically opaque sections and light emitting sections along its length, the conduits being arranged with the light emitting sections of one conduit being offset in one direction from an adjacent conduit such that corresponding light emitting sections of the conduits form diagonal light emitting structures across the plurality of conduits at intervals along the length of the conduits.

2. A light emitting device according to claim 1 wherein the light conduits are side emitting optical fibres.

3. A light emitting device according to claim 2 wherein the light emitting device further includes optical fibre positioning means, said optical fibre positioning means comprising a structure with a plurality of locating means for receiving and locating the plurality of optical fibres side by side to position optical fibre ends for illumination by a directed light beam.

4. A light emitting device according to claim 1 wherein the light conduits are side emitting electroluminescent wires.

5. A light emitting device according to claim 1 wherein the optically opaque sections are formed by masking a side emitting light conduit with a length of optically opaque material.

6. A light emitting device according to claim 5 wherein the length of optically opaque material is a black plastic which is heatshrunk onto the light conduit.

7. A light emitting device according to claim 1 wherein the optically opaque sections are formed by positioning the light conduits in at least one partially covered receptacles.

8. A light emitting device according to claim 1 further comprising an equal number of optically opaque sections and light emitting sections on each light conduit.

9. A light emitting device according to claim 1 wherein each of the optically opaque sections is longer in length than each of the light emitting sections.

10. A light emitting device according to claim 1 wherein each of the optically opaque sections is twice as long as each of the light emitting sections.

11. A light emitting device according to claim 1 wherein the optically opaque sections are each one meter in length.

12. A light emitting device according to claim 1 wherein the offset is a distance substantially equal to the length of a light emitting section.

13. A light emitting device according to claim 1 wherein the diagonal light emitting structures across the conduits are repeated when an end of a final light emitting section of a final light conduit is substantially aligned with a start of a light emitting section of a first light conduit.

14. A light emitting device according to claim 1 wherein the plurality of light conduits is up to 150 meters in length.

15. A directional way finding system comprising:
   drive means,
   a light emitting device comprising a plurality of side emitting light conduits arranged side by side in a longitudinal direction, each conduit having alternating optically opaque sections and light emitting sections along its length, the conduits being arranged with the light emitting sections of one conduit being offset in one direction from an adjacent conduit such that corresponding light emitting sections of the conduits form diagonal light emitting structures across the plurality of conduits at intervals along the length of the conduits, and
   means for selectively energising one or more light conduits in a pattern which provides the perception of sequential illumination to a viewer.

16. A directional way finding system according to claim 15 wherein the drive means is a laser light source.

17. A directional way finding system according to claim 15 wherein the plurality of light conduits comprises optical fibres arranged side by side in the same plane.

18. A directional way finding system according to claim 15 wherein the means for selectively energising one or more light conduits includes means for steering, laser light from the laser light source to the light emitting device such that the laser light is scanned from a first optical fibre to a final optical fibre of the light emitting device to illuminate light emitting optical sections of side emitting optical fibres to provide the perception of sequential illumination to a viewer.

19. A directional way finding system according to claim 18 wherein the means for steering the laser light is a mirror mounted on a spindle which, when rotated on a vertical axis, turns the mirror and causes laser light incident on the mirror to be reflected along the plane of the optical fibres.

20. A directional way finding system according to claim 15 wherein at least two light emitting devices are concatenated to provide a directional way finding system of an extended length.

21. A directional way finding system according to claim 20 wherein part of the laser light source output is coupled into a low-loss optical fibre, output of this low-loss optical fibre being coupled to a subsequent low-loss optical fibre.

22. A directional way finding system according to claim 21 futher comprising a coupling into and out of the low-loss optical fibre provided by an optical element.

23. A directional way finding system according to claim 15 wherein the drive means is a power supply to energise a plurality of electroluminescent wires.

24. A directional way finding system according to claim 14 wherein the plurality of light conduits comprise a plurality of electroluminescent wires arranged side by side in the same plane.

25. A directional way finding system according to claim 23 wherein the means for selectively energising one or more light conduits includes switching means to allow selective drive to at least one of said electroluminescent wires.

26. A directional way finding system according to claim 25 wherein the switching means includes a FET (Field Effect Transistor).

27. A directional way finding system according to claim 25 wherein the switching means is controlled by a microprocessor.

28. A directional way finding system according to claim 27 wherein the switching means and the microprocessor are isolated from each other by an opto switch.

29. A method of providing an illuminated signal which provides to a viewer the perception of movement of the signal in a direction along a plurality of light conduits, said method comprising the steps of, providing a plurality of side emitting light conduits and arranging the light conduits side by side, masking each light conduit at repeated intervals along its length to prevent the emission of light in the masked area, aligning corresponding masked regions in adjacent conduits to defined exposed light emitting areas which have a diagonal structure, and energising the plurality of side emitting light conduits sequentially to create an emitted light signal which appears to the viewer to be travelling along the plurality of conduits in one direction.

30. A method of providing an illuminated signal according to claim 29 wherein the direction in which light appears to be travelling is reversed by reversing the sequence of energising of said plurality of light conduits.

31. A method of providing an illuminated signal according to claim 29 wherein the method includes the step of providing sequentially scanned laser light over an extended directional way finding system by coupling a first low-loss optical fibre to the laser light source, sequentially scanning optical fibre ends of a light emitting device and energising said low-loss optical fibre to at least one subsequent light emitting device.

* * * * *

UNITED STATES PATENT AND TRADEMARK OFFICE
CERTIFICATE OF CORRECTION

PATENT NO.     : 6,526,200 B1
DATED          : February 25, 2003
INVENTOR(S)    : Davie It is certified that error appears in the above-identified patent and that said Letters Patent is hereby corrected as shown below:

Column 1,
Before line 10, insert -- Background of the Invention --.

Column 5,
Line 24, replace "18care" with -- 18c are --.

Column 6,
Line 1, replace "35" with -- 36 --.
Line 21, replace "First" with -- first --.

Column 7,
Line 24, replace "56i" with -- 56 --.

Signed and Sealed this

Ninth Day of September, 2003

JAMES E. ROGAN
*Director of the United States Patent and Trademark Office*